(12) United States Patent
Korolev et al.

(10) Patent No.: US 8,041,683 B1
(45) Date of Patent: Oct. 18, 2011

(54) METHODS AND APPARATUS FOR LOCATING NETWORK LOGS

(75) Inventors: Eugenio Korolev, Framingham, MA (US); Charuta Vijaykumar Apte, Milford, MA (US); Boris Farizon, Westborough, MA (US); Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1408 days.

(21) Appl. No.: 11/540,105

(22) Filed: Sep. 29, 2006

(51) Int. Cl.
*G06F 17/30* (2006.01)
(52) U.S. Cl. ...................................................... 707/672
(58) Field of Classification Search .................. 707/812, 707/672; 709/231, 248
See application file for complete search history.

(56) References Cited

U.S. PATENT DOCUMENTS

| | | | |
|---|---|---|---|
| 6,282,175 B1 * | 8/2001 | Steele et al. | 370/254 |
| 7,328,260 B1 * | 2/2008 | Muthiyan et al. | 709/224 |
| 2004/0236866 A1 * | 11/2004 | Dugatkin et al. | 709/235 |
| 2007/0028116 A1 * | 2/2007 | Murison et al. | 713/181 |
| 2007/0156698 A1 * | 7/2007 | Gebhart et al. | 707/10 |
| 2007/0283194 A1 * | 12/2007 | Villella et al. | 714/57 |

* cited by examiner

*Primary Examiner* — Charles Kim
*Assistant Examiner* — Fatima Mina
(74) *Attorney, Agent, or Firm* — Krishnendu Gupta; Gerald P. Kazanjian (57) ABSTRACT

A log collection utility (LCU) operable in a storage area network (SAN) to identify the various types of log files generated in the SAN computes the location of each of the log files, and collects the log files for consolidation and analysis in a common repository. The LCU periodically collects and/or processes the log files by enumerating the location of each of the log files in a log file designator, and generates a script operable for identifying each of the log files sought. A resulting task definition file lists each of the log files identified. The log collection utility therefore finds log files generated by dissimilar applications and nodes in the SAN via a log type definition that enumerates each of the log files in a manner that is agnostic to operating systems, platforms, and directory structures around which the log files are written and stored.

18 Claims, 7 Drawing Sheets

```
- <lcuLogtypes>
    <category id="AGENT_LOGS" description="ControlCenter Agent Logs">
      -<logtype id="EGS" osType="All" description="Storage Agent for Symmetrix">
         <query type="EnvironmentVariable" queryInput="ECC_HOME"/>
         <logSubtype id="EGS trace" relPath="EGS*" regex="EGS*.log*"/>
      </logtype>
      -<logtype id="MGA" osType="All" description="Master Agent Logs"/>
         <query type="RegistryKey" queryInput="ECC_HOME"/>
         <logSubtype id="MGA trace" relPath="MGA*" regex="MGA*.log*"/>
      </logtype>
    </category>
  </lcuLogtypes>
```

METHODS AND APPARATUS FOR LOCATING NETWORK LOGS

BACKGROUND

In a storage area network (SAN), a SAN management application monitors and manages manageable entities in the SAN. Each of the manageable entities is a component, or resource, deployed with other SAN components in a particular configuration. The manageable entities include storage arrays, connectivity devices, and hosts. Typically, software entities known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

In general, therefore, the storage area network (SAN) is a collection of data storage systems that are networked via a switching fabric to a number of host computer systems operating as data servers for user access. In a large storage area network, the interconnections between the manageable entities may become numerous and complex. A discovery operation identifies the topology of the SAN so that the management application may identify, manipulate, and report on each of the manageable entities and interconnections in the SAN. Each of the hosts includes agents for monitoring and manipulating the manageable entities corresponding to that host. The hosts, therefore, may include various applications and agents depending on the manageable entities responsive to the host. Each of the applications and agents may generate log files to track the operational history of the host. The location of the log file is generally specific to the particular application and agent. Each host may therefore generate multiple logs in various locations on the host. In a large SAN, there may be a multitude of log files scattered in various places on the SAN.

SUMMARY

A storage area network (SAN) includes many interconnected nodes for providing mass data storage and retrieval services. The nodes, include storage arrays, switching devices, and hosts, and are interconnected in a SAN fabric of interconnections. The SAN management application maintains the topology of the SAN in a data structure operable to identify each of the components, or nodes, and the relations between them. The nodes are individual manageable entities responsive to the management application, and include network devices such as the storage arrays, switching devices, and hosts, as well as hardware and software components such as disks, ports, agents, adaptors, and other included manageable entities.

A storage area network (SAN) typically employs a management application for monitoring and managing the various nodes in the SAN. The SAN nodes are interconnected within the SAN for providing mass data storage and retrieval services to the user community. Other hardware and software entities, such as disk drives in the storage arrays, and agents running on the hosts, are also manageable from the management application, collectively defining a set of manageable entities in the SAN.

The SAN management application therefore integrates monitoring and control of a variety of manageable entities within the SAN. Many of the manageable entities generate one or more log files, either directly or via another manageable entity (such as disk drives in a storage array). Conventional management applications, however, suffer from the shortcoming that the log files are from dissimilar applications and sources and are difficult to identify and aggregate in a common, consistent manner. It is cumbersome to identify and enumerate (list) available log files in a common list or repository. Conventional arrangements, therefore, cannot enumerate multiple dissimilar log files from different hosts with possibly different operating systems and file structures. Accordingly, many conventional log files may evade collection and/or analysis.

In a storage area network (SAN), it is beneficial to collect and analyze the various log files generated by or on behalf of the various manageable entities in the SAN. Accordingly, configurations herein substantially overcome the difficulties of conventional gathering of log files by defining a log collection utility (LCU) operable to identify the various types of log files generated in the SAN, compute the location of each of the log files, and collect the log files for consolidation and analysis in a common repository. The management application periodically collects and/or processes the log files by enumerating the location of each of the log files in a log file designator, and generates a script operable for identifying each of the log files sought. A task definition file lists each of the log types identified for potential collection, and is employed by the management application for generating a collection script operable to gather the each of the log files and consolidate them in a common location, typically by copying and zipping (compressing) each of the defined log files from the log file designator. In this manner, the log collection utility is operable to find and gather the contents of each of a plurality of log files generated by dissimilar applications and nodes in the SAN via a log type definition that enumerates each of the log files in a manner that is agnostic to operating systems, platforms, and directory structures around which the log files are written and stored.

In further detail, the method for identifying log files in a heterogeneous storage area network (SAN) includes, in the example configuration discussed below, identifying a set of hosts in the SAN, in which each host has at least one log file and is operable for log file collection, and computing, for each host in the identified set of hosts, a query type indicative of the manner of locating the log files. The method stores, for each host, a log file designator indicative of the location of log files on that host, such that the log file designator is independent of the operating system corresponding to each host, OS independence meaning that the log file designator provides a generic format operable to specify log files on hosts regardless of the OS of the particular hosts. The typical log file designator therefore selectively operates on available variables that themselves may or may not be independent of the OS on a particular machine. For example, a log file designator may invoke an operation Get Environmental Variable that is independent of the OS, or may invoke an operation to get a registry value that is specific to a particular OS (i.e. Windows). Using each of the log file designators, a log collection utility determines a path operable to locate the log files on each of the hosts in the set of hosts, and determining an expression indicative of a file specification, in which the file specification denotes the log files. A corresponding script discovers the log files on each of the hosts in the set of hosts, in which the hosts need not support similar file systems.

In the example configuration, the log collection utility generates commands for performing the identifying, computing, and determining the path and file specification for the log files, and stores the generated commands in a script file. Following transmission, a receiving host executes the script file to generate a task list of available log types.

The script is for determining, for each host, types of log files installed on that host, in which the type is indicative of a query type for accessing the log files, and for determining a file specification corresponding to each of the determined types of log files. Therefore, the script uses the query type and corresponding query input for determining the types of log files installed on the particular host. The query type is at least one of an environment variable or a registry key, such that the query type is indicative of the storage location of the log files, and employing the query type involves selectively retrieving at least one of an environment variable or a registry key as input to the script. The path is indicative of a file system traversal, and is employed for identifying, from the query type, a storage area for the log files, followed by appending, to the identified storage area, the path. The example arrangement also determines a category of the log files selected from the group consisting of infrastructure logs, agent logs and third party software logs.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 shows the attributes of a log file designator employed in FIG. 3;

DETAILED DESCRIPTION

In the storage area network (SAN), it is beneficial to collect and analyze the various log files generated by or on behalf of the various manageable entities in the SAN. A log collection utility (LCU) is a part of the management application the identifies the various types of log files generated in the SAN, computes the location of each of the log files, and collect the log files for consolidation and analysis in a common repository. The log collection utility periodically collects and/or processes the log files by enumerating the location of each of the log files in a script file which may be an XML file or other type of script file or source file known as a log file designator file, and generates a find script operable for identifying each of the log types sought. A task definition file lists each of the log types identified, and is employed by the management application for further processing, such as generating a collection script operable to gather the each of the log files and consolidate them in a common location. In this manner, the log collection utility is operable to find each of a plurality of log files generated by dissimilar applications and nodes in the SAN via a log type definition that enumerates each of the log files in a manner that is agnostic to operating systems, platforms, and directory structures around which the log files are written and stored.

Figure 1:
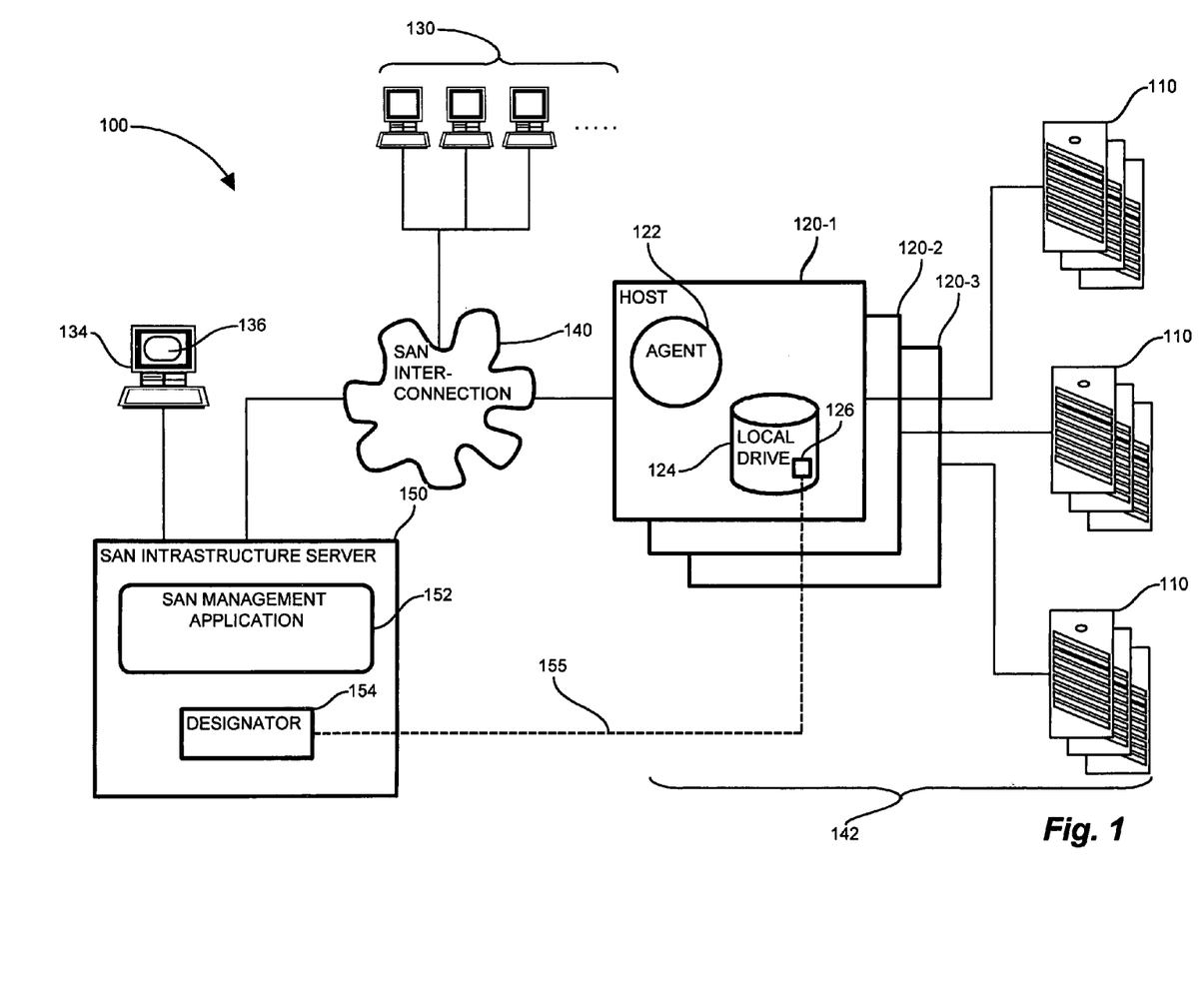
FIG. 1 is a context diagram of an exemplary managed information environment suitable for use with the present invention.

FIG. 1 is a context diagram of an exemplary managed information environment suitable for use with the present invention. Referring to FIG. 1, in a storage area network 100, storage arrays 110 are coupled to hosts 120 for providing data storage and retrieval services to a user community 130. A SAN interconnection 140 provides the network infrastructure to physically interconnect various SAN nodes 142, including storage arrays 110 and hosts 120-1 ... 120-N (120 generally). Other network nodes, such as switching devices (not specifically shown) are also typically included. A SAN infrastructure server 150 includes a SAN management application 152 for monitoring and managing the SAN nodes 142, typically via a console 134 having a graphical user interface (GUI) 136. The hosts 120 include agents 122 responsive to the management application 152. Each host 120 typically includes a plurality of agents 122 for performing a variety of management operations concerning the storage arrays 110, such as gathering performance statistics, performing access control, and configuration management tasks, for example. Each of the hosts generates various logs (log files) depending on the operations performed by the hosts. The log files may be written to various repositories (i.e. directories) on a local volume 124 (i.e. local drive), depending on the operating system, devices connected to the host, and tasks requested of the host 120. In a large SAN, having many hosts 122 tasked with various specialized operations, multiple log files may be stored in various locations on a particular host 122. In accordance with configurations herein, the management application 152 employs a log file designator 154 for identifying each of the logs on the local drive 124 on the hosts 120, shown by dotted line 155.

Figure 2:
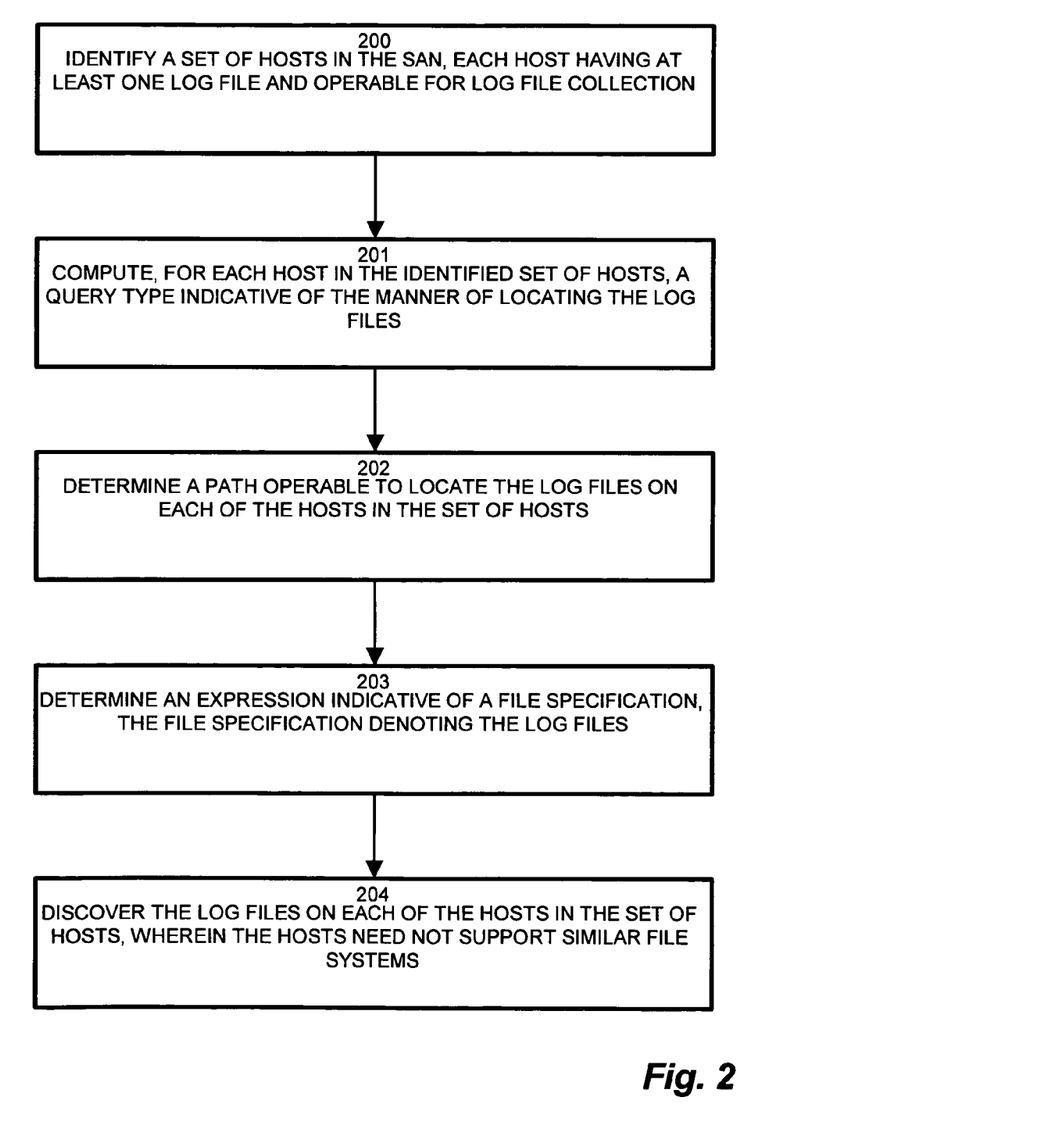
FIG. 2 is a flowchart of log file identification in the environment of FIG. 1.

FIG. 2 is a flowchart of log file identification in the environment of FIG. 1. Referring to FIGS. 1 and 2, the method for identifying log files in a heterogeneous storage area network (SAN) 100 as defined herein includes, at step 200, identifying a set of hosts 120 in the SAN 100, in which each host 120 has at least one log file and is operable for log file collection. The log collection utility (LCU) employs log file designators 154 to compute, for each host 120 in the identified set of hosts 120, a query type indicative of the manner of locating the log files 126, as depicted at step 201. The designator 154 is further employed for determining a path operable to locate the log files 126 on each of the hosts 120 in the set of hosts 120-N, as disclosed at step 202, and for determining an expression indicative of a file specification, such that the file specification denotes the log files 126, as depicted at step 203. The information computed from the designator 154 is employed to discover the log files 126 corresponding to the designator 154 on each of the hosts 120 in the set of hosts, in which the hosts 120 need not support similar file systems or operating systems, as disclosed at step 204. The identified log files 126 take the form of a task definition (174, FIG. 3, below) operable to perform an operation on the identified log files, such as log file collection, discussed further in copending U.S. patent application Ser. No. 11/540,184 filed concurrently, entitled "METHODS AND APPARATUS FOR DECLARITIVE LOG COLLECTION", incorporated herein by reference.

Figure 3:
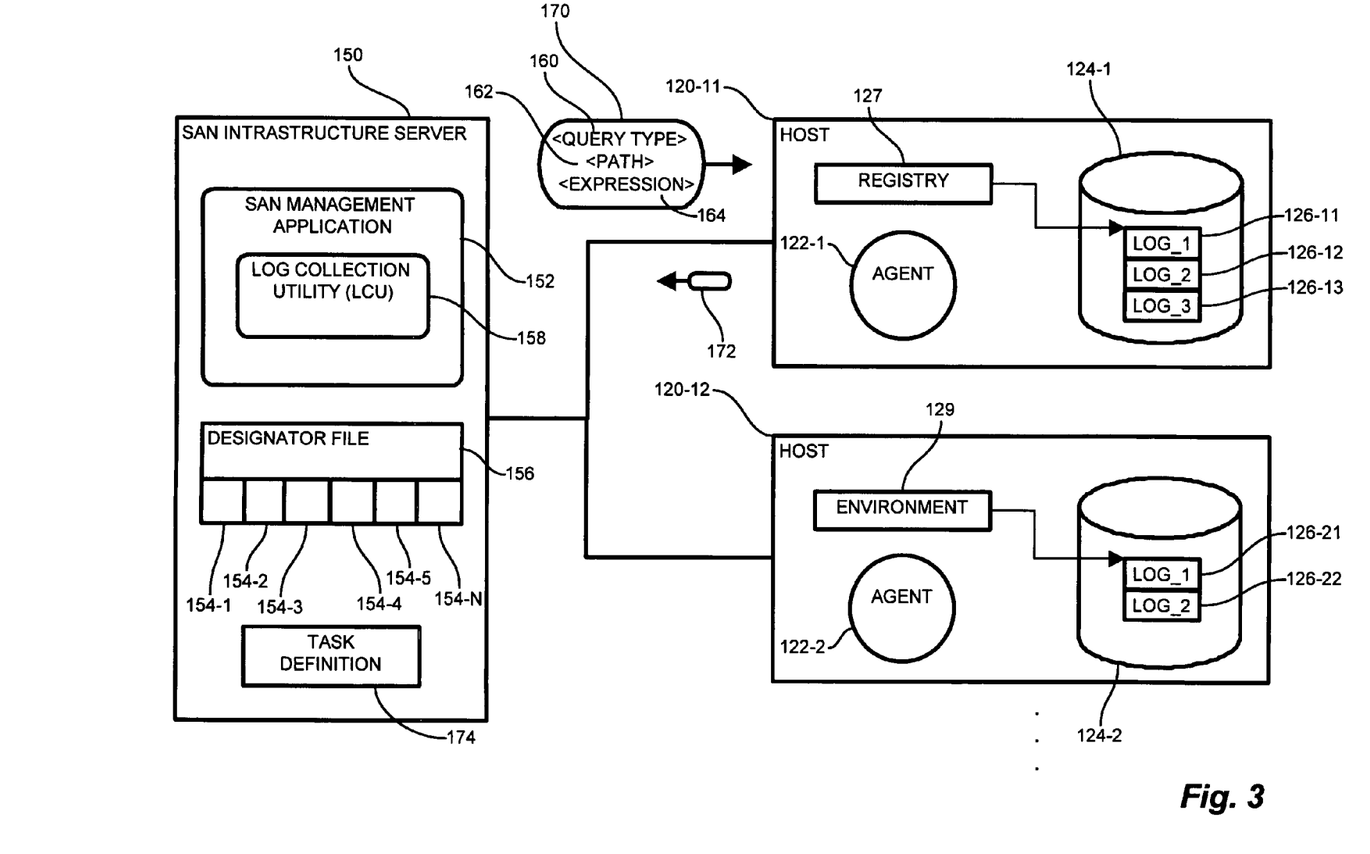
FIG. 3 is a block diagram of log file identification in the environment of FIG. 1.

FIG. 3 is a block diagram of log file identification in the environment of FIG. 1. FIG. 3 shows dissimilar hosts 120-11 . . . 120-12 having multiple log files 126-N on each local volume 124-1 . . . 124-2. Each log file 126 has a corresponding designator 154 stored in a designator file 156. The SAN management application 152 includes a log collection utility 158 operable to read the designator file 156 and compute the corresponding log files 126-N. The log collection utility 158 identifies, for each host 120, a query type 160 corresponding to the manner of storage of the log files 126. The example query type indicates whether log files are invokeable via a registry key 127 or environment variable 129. Using the designator 154, the log collection utility 158 can generate an identification script 170, or find script, that executes on the host 120 and returns the identity 172 of each of the log files 126 specified by the designator 154. The query types 160 therefore include registry inquiries and environment variables, which indicate the OS (operating system) dependent organization of the log files 126. Other query types 160 may be employed for alternate OS and/or file system arrangements. Once determining the query type 160 and referencing the appropriate registry 127 or environment variable 129, the designator 154 further indicates a path 162 to the location of the log files 126. The path 162 is typically indicative of a directory hierarchy. The designator 154 also includes an expression 164 that evaluates to a file specification of one or more log files 126. The log collection utility 158 appends the expression 164 to the path 162 to uniquely identify each log file 126 on the local drive 124.

For each host 120 having log files 126, the log collection utility 158 generates the identification (find) script 170 operable to execute on the host 120 and return the identity 172 of each of the log types. The returned identity 172 specifies the network location of the log file 126. The log collection utility 158 receives the identity 172 and generates a task definition 174 operable to retrieve each of the files 126 for all specified log types. Each host 120 receives a script 170 for identifying the log files accessible on that host 120, and there are typically multiple logs types on each host 120. Accordingly, many log type identities 172 corresponding to the particular available log files are returned. Note that the designators 154 may include wildcard characters and directory specifications that encompass multiple log files 126-N, each of which is enumerated in the returned identity 172. Therefore, the resulting task definition 174 is operable to identify and retrieve a plurality of log files 126-N from a plurality of hosts 120-N, discussed further in copending U.S. patent application cited above.

FIG. 4 shows the attributes of a log file designator 154 employed in FIG. 3. The log file designator 154 allows platform and OS independent specification of log files 126 for subsequent identification and collection, as discussed above. Each log file designator 154 has fields deterministic of the log files it corresponds to. In the example arrangement, the log file designator 154 is an XML script having tags corresponding to the fields. Alternate syntactical arrangements may be employed. Referring to FIG. 4, each log file designator 154 includes a category tag (field) 180 indicative of the originator of the logs, and includes agent processes, infrastructure processes, and third party software processes. A log type tag (field) 182 subdivides the types of processes generating the logs, i.e. different agents. A query type tag 184 specifies the type of query made on a particular host to determine the log file locations, used to populate the query type 160 in the script 170. In the example configuration, the query type tag 184 indicates whether a registry key or an environment variable is employed to identify the logs. A log subtype tag 186 specifies a particular file or set of files, and is accompanied by a relative path tag 188 indicating a directory hierarchy through which the logs may be obtained, corresponding to the path 162 script field, and a regular expression 190 specifying the file names (expression 164) and may include wildcards. Each of these fields is employed in generating the script 170 operable to execute on a particular host 120 for returning the identity 172 of the log files 126-$n$ corresponding to the designator 156. A set of log file designators 154 applicable to the set of hosts 120 in a SAN is stored in the log designator file 156.

Figure 5:
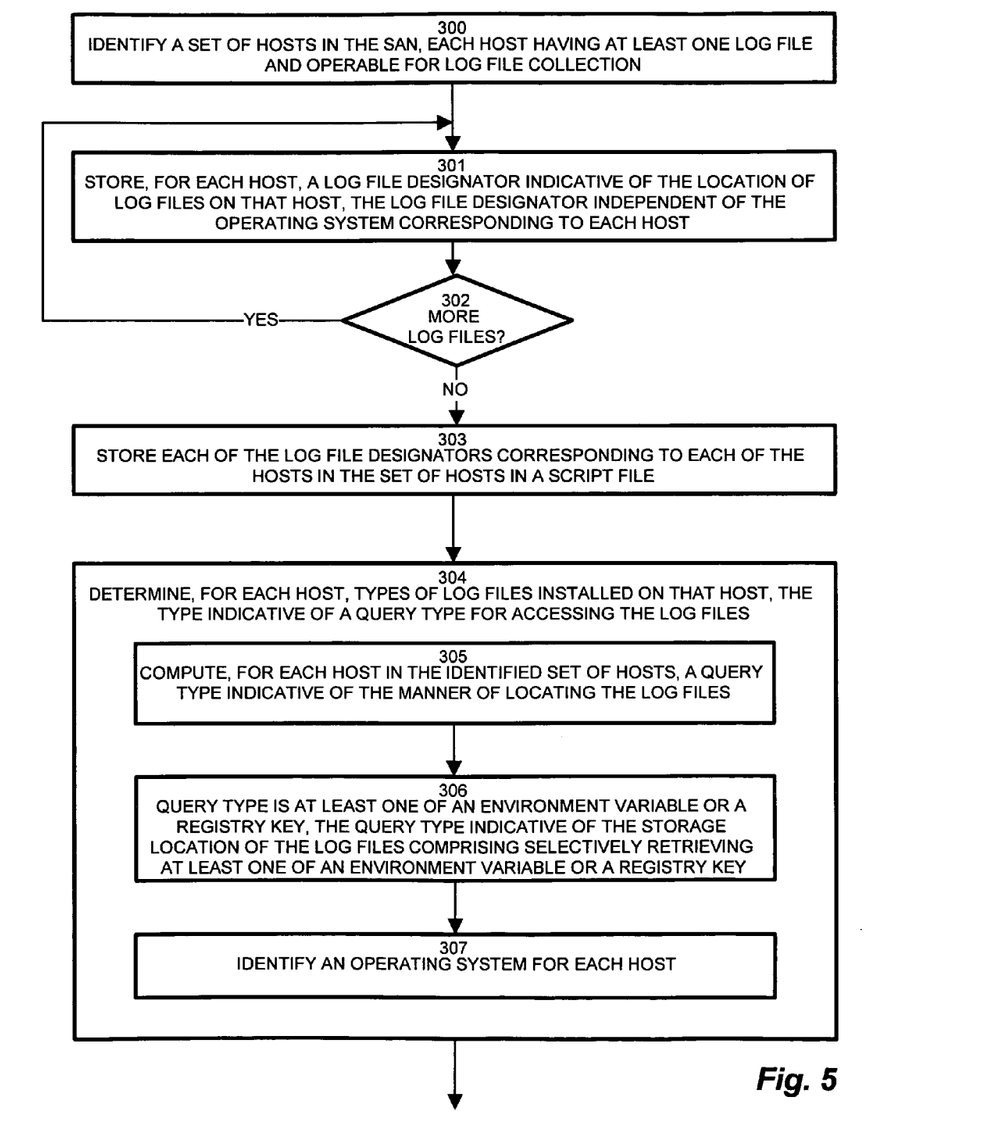
FIGS. 5-7 are a flowchart of script and task generation for identifying log files using the log file designator of FIG. 4.
Figure 6:
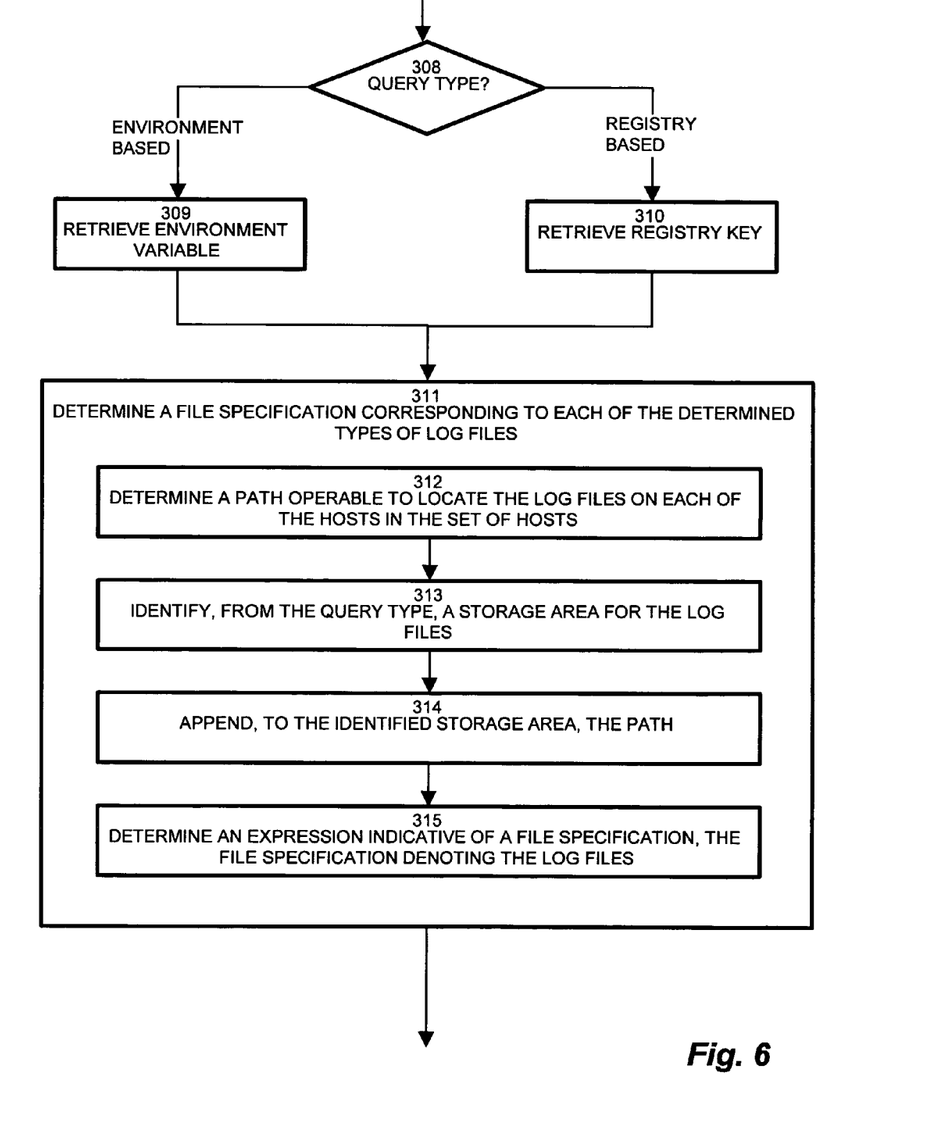
Figure 7:
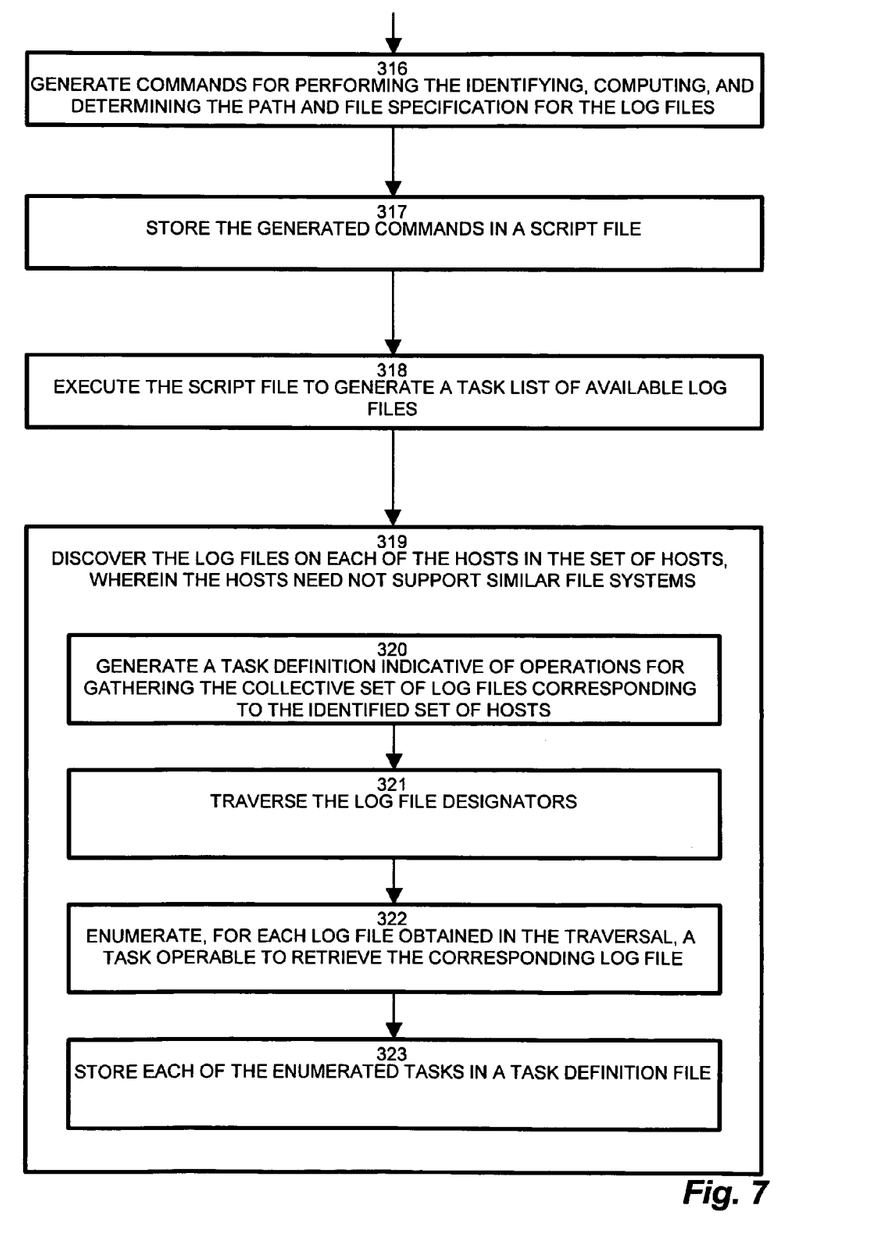

FIGS. 5-7 are a flowchart of script and task generation for identifying log files 126 using the log file designator 154 of FIG. 4. The log file designator 154 is employed for example operation of generating a task definition 174 encompassing the log files 126-N corresponding to each of the platform agnostic log file designators 154. Other applications of the designator 154 and resulting task definition 174 may be pursued in alternate configurations. Referring to FIGS. 1 and 3-7, at step 300, a topology mapping, discovery result, configuration map or other SAN resource identifies a set of hosts 120-1 . . . 120-N in the SAN 100, such that each host 120 has one or more log files 126 operable for log file collection. The SAN management application 152 is employed to store, for each host 120, a log file designator 154 (shown and discussed further below with respect to FIG. 8) indicative of the location of log files on that host, in which the log file designator 154 is independent of the operating system corresponding to each host 120, as depicted at step 301. A plurality of designators, each corresponding to a type of logs on a particular host, and may be stored in the same file or script, discussed further below. Therefore, the log file designator 154 may be employed to specify a log file 126 or files on any SAN node 142 regardless of the operating system, file structure, or applications installed on the particular SAN node 120. In other words, the log file designator 154 syntax may apply to any host 120 in the SAN.

A check is performed, at step 302, to determine if there are more log files 126 for which log file designators 154 are to be defined. Control reverts to step 301 accordingly. Each of the log file designators 154-1 . . . 154-N corresponding to each of the hosts 120 in the set of hosts is stored in a script file, or designator file 156, as shown at step 303. In the exemplary configuration, the designator file 156 is an XML (Extensible Markup Language) script file that stores each of the log file designators 154, however any suitable scripting and representation syntax may be employed.

The log collection utility 158 then determines, for each host 120, types of log files installed on that host, in which the type corresponds to a query type 160 for accessing the log files, as depicted at step 304. The query type 160 is indicative of the manner of accessing the log files 126 based on the operating system present on the host 120 in question. In the example configuration, the query type 160 specifies whether an environment variable 129 or a registry key 127 is employed for accessing the logs 126. Accordingly, using the log file designators 154, the LCU 158 computes, for each host 120 in the identified set of hosts, a query type indicative of the manner of locating the log files 126, as depicted at step 305. The query type 160 is at least one of an environment variable 129 or a registry key 127, such that the query type is indicative of the storage location of the log files, as depicted at step 306. Computing the query type 160 further comprises identifying an operating system for each host, as shown at step 307. Accordingly, a check is performed at step 308 to see if the particular log file designator 154 indicates retrieval of an environment variable 129, as shown at step 309, or a registry key 127, as depicted at step 310. The operating system typically dictates the manner of storing the log files, as Windows® based applications employ a registry and Unix platforms invoke an environment variable.

The log collection utility 158 then determines a file specification corresponding to each of the determined types of log files for the log file designator 154, as depicted at step 311. This includes determining a path 162 operable to locate the log files 126 on each of the hosts 120 in the set of hosts, as shown at step 312, such that the path 162 is indicative of a file system traversal. The LCU 158 identifies, from the query type 160, a storage area for the log files 126 (i.e. registry based or environment variable based), as shown at step 313, and appends, to the identified storage area, the path, as depicted at step 314. The LCU 158 then determining an expression indicative of a file specification, in which the file specification denotes the log files 126, as shown at step 315.

The log collection utility 158 employs the log file specification computed from the log file designators 154 to generate commands for performing the identifying, computing, and determining the path and file specification for the log files on the host 120, as depicted at step 316. Thus, the LCU 158 generates a script 170 executable on each host 120 for identifying the respective log files 126. The LCU 158 stores the generated commands in the script file 170, as shown at step 317, and the host 120 executes the transmitted script file 170 to generate a task list of the identity 172 of available log files 126, as depicted at step 318.

The executing script file 170 discovers the log files 126 on each of the hosts 120 in the set of hosts 120-N, wherein the hosts 120 need not support similar file systems, as shown at step 319. In the example arrangement shown, discovering further comprises generating a task definition 174 from the returned identifiers 172 indicative of operations for gathering the collective set of log files 126 corresponding to the identified set of hosts 120, as shown at step 320. The LCU 158 generates the task definition 174 using the designator file 156 and the returned (discovered) log file identifiers 172. The LCU 158 traverses the log file designators 154, as shown at step 321, and enumerates, for each log file 126 obtained in the traversal, a task operable to retrieve the corresponding log file, as shown at step 322. The LCU 158 then stores each of the enumerated tasks in a task definition file 174, for subsequent operations on the log files 126. In an example configuration, the task definition 174 may be used for collecting the log files 126, as discussed further in the copending application cited above.

Those skilled in the art should readily appreciate that the programs and methods for identifying log files as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for identifying log files has been particularly shown and described with references to embodiments thereof, it will be understood by those skilled in the art that various changes in form and details may be made therein without departing from the scope of the invention encompassed by the appended claims.

What is claimed is:

1. A method for identifying log files at a SAN infrastructure server from hosts in a heterogeneous storage area network (SAN) comprising:

identifying at the SAN infrastructure server a set of hosts in the SAN, each host having at least one log file and operable for log file collection; each host including an agent configured to manage resources in the SAN:

computing, at the SAN infrastructure server, for each host in the identified, set of hosts, a query type indicative of the manner of locating the log files stored in various locations on the host according to an application executing on the host or agent that generated the log files depending on the manageable entities responsive to the host;

determining at the SAN infrastructure server a path operable to locate the log files on each of the hosts in the set of hosts according to the identification of each of the hosts in the set of hosts;

determining at the SAN infrastructure server an expression indicative of a file specification according to the identification of each of the hosts in the set of hosts, the file specification denoting the log files;

generating at the SAN infrastructure server a script file for discovering the log files on each of the hosts in the set of hosts according to the query type, path and expression, wherein the hosts need not support similar file systems, wherein generating a script file further comprises generating a task definition indicative of operations for gathering the collective set of log files corresponding to the identified set of hosts by:

traversing at least one log file designators;
enumerating, for each log file obtained in the traversal, a task operable to retrieve the corresponding log file; and
storing each of the enumerated tasks in a task definition file;
transferring the script file from the SAN infrastructure server to each host in the identified set of hosts for execution at each respective host in the identified set of hosts; and
receiving at the SAN infrastructure server, in response to execution of the transferred script on each host in the identified set of hosts, identification of each log file type at each respective host in the identified set of hosts.

2. The method of claim 1 wherein generating at the SAN infrastructure server a script file for discovering the log files on each of the hosts in the set of hosts according to the query type, path and expression further comprises:
generating at the SAN infrastructure server commands for performing the identifying, computing, and determining the path and file specification for the log files at each of the hosts in the set of hosts; and
storing at the SAN infrastructure server the generated commands in the script file for transfer from the SAN infrastructure server to each host in the identified set of hosts for execution of the script file to generate a task list of available log files.

3. The method of claim 2 further comprising:
determining, for each host, types of log files installed on that host, the type indicative of a query type for accessing the log files; and
determining a file specification corresponding to each of the determined types of log files.

4. The method of claim 3 wherein the query type is at least one of an environment variable or a registry key, the query type indicative of the storage location of the log files, further comprising selectively retrieving at least one of an environment variable or a registry key.

5. The method of claim 4 wherein the path is indicative of a file system traversal, further comprising:
identifying, from the query type, a storage area for the log files; and
appending, to the identified storage area, the path.

6. The method of claim 5 further comprising determining a category of the log files selected from the group consisting of infrastructure logs, agent logs and third party software logs.

7. The method of claim 1 further comprising storing, for each host, a log file designator indicative of the location of log files on that host, the log file designator independent of the operating system corresponding to each host.

8. The method of claim 7 wherein computing the query type further comprises identifying an operating system for each host.

9. The method of claim 8 further comprising storing each of the log file designators corresponding to each of the hosts in the set of hosts in a designator script file.

10. A SAN infrastructure server for identifying log files in a heterogeneous storage area network (SAN) comprising:
a processor; and
memory encoded with instruction that, When executed on the processor, cause the SAN infrastructure server to:
identify a set of hosts in the SAN, each host having at least one log file and operable for log file collection, each host including an agent configured to manage resources in the SAN;
compute, for each host in the identified set of hosts, a query type indicative of the manner of locating the log files stored in various locations on the host according to an application executing on the host or agent that generated the log files depending on the manageable entities responsive to the host,
determine a path operable to locate the log files on each of the hosts in the set of hosts according to the identification of each hosts in the set of hosts,
determine an expression indicative of a file specification according to the identification of each of the hosts in the set of hosts, the file specification denoting the log files;
generate a script file operable to discover the log files on each of the hosts in the set of hosts according to the query type, path and expression, wherein the hosts need not support similar file systems, the script file generated by generating a task definition indicative of operations for gathering the collective set of log files corresponding to the identified set of hosts by:
traversing at least one log file designators;
enumerating, for each log file obtained in the traversal, a task operable to retrieve the corresponding log file; and
storing each of the enumerated tasks in a task definition file;
transfer the script file to each host in the identified set of hosts for execution at each respective host in the identified set of hosts; and
receive, in response to execution of the transferred script on each host in the identified set of hosts, identification of each log file type at each respective host in the identified set of hosts.

11. The server of claim 10 further comprising:
a designator file indicative of log files on each of the hosts, the log collection utility responsive to the designator file for:
generating commands for performing the identifying, computing, and determining the path and file specification for the log files; and
storing the generated commands in the script file for transfer from the SAN infrastructure server to each host in the identified set of hosts for execution of the script file to generate a task list of available log files.

12. The server of claim 11 wherein the log collection utility is operable to employ the designator file to:
determine, for each host, types of log files installed on that host, the type indicative of a query type for accessing the log files; and
determine a file specification corresponding to each of the determined types of log files.

13. The server of claim 12 wherein the designator file specifies the query type, the query type being at least one of an environment variable or a registry key, the query type indicative of the storage location of the log files, the executed script file operable to selectively retrieve at least one of an environment variable or a registry key.

14. The server of claim 13 wherein path is indicative of a file system traversal, the executed script file further operable to:
identify, from the query type, a storage area for the log files; and
append, to the identified storage area, the path.

15. The server of claim 10 further comprising, for each host, a log file designator indicative of the location of log files on that host, the log file designator independent of the operating system corresponding to each host.

16. The server of claim 15 wherein the log collection utility is operable to computing the query type by identifying an operating system for each host.

17. The server of claim 16 further comprising storing each of the log file designators corresponding to each of the hosts in the set of hosts in a designator script file, the designator script file further indicative of, for each host, a category of the log files selected from the group consisting of infrastructure logs, agent logs and third party software logs.

18. A computer program product having a non-transitory computer readable medium operable to store computer program logic embodied in computer program code encoded thereon as an encoded set of processor based instructions for performing a method of identifying log files at a SAN infrastructure server in a heterogeneous storage area network (SAN), comprising:

computer program code for identifying a set of hosts in the SAN, each host having at least one log file and operable for log file collection, each host including an agent configured to manage resources in the SAN;

computer program code for computing, for each host in the identified set of hosts, a query type indicative of the manner of locating the log files stored in various locations on the host according to an application executing on the host or agent that generated the log files depending on the manageable entities responsive to the host;

computer program code for determining a path operable to locate the log files on each of the hosts in the set of hosts according to the identification of each of the hosts in the set of hosts;

computer program code for determining an expression indicative of a file specification according to the identification of each of the hosts in the set of hosts, the file specification denoting the log files;

computer program code for generating a script file at the SAN infrastructure server for discovering the log files on each of the hosts in the set of hosts according to the query type, path and expression, wherein the hosts need not support similar file systems by generating commands for performing the identifying, computing, and determining the path and file specification for the log files and storing the generated commands in the script file for transfer from the SAN infrastructure server to each host in the identified set of hosts for execution of the script file to generate a task list of available log files, wherein computer program code for generating a script file wherein computer program code for generating a script file further comprises computer program code for generating a task definition indicative of operations for gathering the collective set of log files corresponding to the identified set of hosts by:

traversing at least one log file designators;

enumerating, for each log file obtained in the traversal, a task operable to retrieve the corresponding log file; and storing each of the enumerated tasks in a task definition file;

computer program code for transferring the script file from the SAN infrastructure server to each host in the identified set of hosts for execution at each respective host in the identified set of hosts; and computer program code for receiving at the SAN infrastructure server, in response to execution of the transferred script on each host in the identified set of hosts, identification of each log file type at each respective host in the identified set of hosts.

* * * * *